(12) United States Patent
Tseng et al.

(10) Patent No.: US 10,784,693 B2
(45) Date of Patent: Sep. 22, 2020

(54) CHARGING DEVICE AND CHARGING SYSTEM

(71) Applicant: CLOUD NETWORK TECHNOLOGY SINGAPORE PTE. LTD., Singapore (SG)

(72) Inventors: Chuang-Wei Tseng, New Taipei (TW); Yu-Ching Chien, New Taipei (TW); Yu-Wen Chen, New Taipei (TW); Kuang-Yu Liu, New Taipei (TW)

(73) Assignee: Cloud Network Technology Singapore Pte. Ltd., Singapore (SG)

( * ) Notice: Subject to any disclaimer, the term of this patent is extended or adjusted under 35 U.S.C. 154(b) by 469 days.

(21) Appl. No.: 15/263,341

(22) Filed: Sep. 12, 2016

(65) Prior Publication Data
US 2018/0034294 A1    Feb. 1, 2018

(30) Foreign Application Priority Data
Jul. 29, 2016    (CN) .......................... 2016 1 0610619

(51) Int. Cl.
*H02J 7/00*    (2006.01)
(52) U.S. Cl.
CPC .......... *H02J 7/0044* (2013.01); *H02J 7/00034* (2020.01)
(58) Field of Classification Search
CPC ...... H02J 7/0044; H02J 7/0027; H02J 7/0045; H02J 7/0034; B60L 53/16
USPC ................................................. 320/107, 109
See application file for complete search history.

(56) References Cited

U.S. PATENT DOCUMENTS

| | | | |
|---|---|---|---|
| 7,729,803 B2* | 6/2010 | Lim | G05D 1/0225 700/245 |
| 7,775,801 B2* | 8/2010 | Shiff | H01R 13/6205 439/39 |
| 8,022,664 B2 | 9/2011 | Shu | |
| 8,253,372 B2* | 8/2012 | Lai | B25J 19/005 320/107 |
| 8,339,098 B2* | 12/2012 | Zhang | H01M 10/44 320/114 |
| 8,672,228 B1* | 3/2014 | Saini | H01R 13/44 235/486 |

(Continued)

FOREIGN PATENT DOCUMENTS

| | | |
|---|---|---|
| CN | 101714676 A | 5/2010 |
| CN | 105449780 A | 3/2016 |

*Primary Examiner* — Richard Isla
*Assistant Examiner* — Tessema Kebede
(74) *Attorney, Agent, or Firm* — ScienBiziP, P.C.

(57) ABSTRACT

A charging device includes a case, a first connector, a first communication device, a processing device, and a driving device. The first communication device is configured to communicate with a second communication device of an electrical device and send a control signal to the processing device after communicating with the second communication device. The processing device is configured to output a driving signal to the driving device after receiving the control signal. The driving device is configured to provide a pushing force to push the first connector to extend from the case to couple to a second connector of the electrical device after receiving the driving signal. The first connector is further configured to charge the electrical device after couple to the second connector. A charging system is also provided.

16 Claims, 4 Drawing Sheets

(56) References Cited

U.S. PATENT DOCUMENTS

| | | | | |
|---|---|---|---|---|
| 8,894,419 B1* | 11/2014 | Buelow | H01R 13/6205 | 439/218 |
| 2005/0083011 A1* | 4/2005 | Yang | A47L 9/00 | 320/107 |
| 2006/0040171 A1* | 2/2006 | Lee | H02J 7/0004 | 429/61 |
| 2008/0042620 A1* | 2/2008 | Udono | H02J 7/0045 | 320/137 |
| 2008/0076347 A1* | 3/2008 | Chang | H04N 1/00307 | 455/3.05 |
| 2008/0174268 A1* | 7/2008 | Koo | A47L 9/2805 | 320/109 |
| 2009/0111320 A1* | 4/2009 | Johansson | H01R 13/24 | 439/466 |
| 2009/0111533 A1* | 4/2009 | Johansson | H01R 13/502 | 455/575.1 |
| 2009/0322278 A1* | 12/2009 | Franks | H02J 7/0045 | 320/107 |
| 2010/0035441 A1* | 2/2010 | Rohrbach | H01R 13/6205 | 439/39 |
| 2010/0085007 A1* | 4/2010 | Shu | B25J 19/005 | 320/107 |
| 2013/0157477 A1* | 6/2013 | McCormack | H01R 13/6205 | 439/39 |
| 2013/0169215 A1* | 7/2013 | Sakai | H02J 7/0042 | 320/107 |
| 2016/0332526 A1* | 11/2016 | Svensson | A01D 34/008 | |
| 2018/0126861 A1* | 5/2018 | Dorndorfer | B60L 11/1846 | |

\* cited by examiner

CHARGING DEVICE AND CHARGING SYSTEM

FIELD

The subject matter herein generally relates to charging devices and charging systems.

BACKGROUND

A charging system comprises a charging device and electrical devices, the charging device can be used to charge the electrical devices.

BRIEF DESCRIPTION OF THE DRAWINGS

Implementations of the present technology will now be described, by way of example only, with reference to the attached figures.

DETAILED DESCRIPTION

Figure 1:
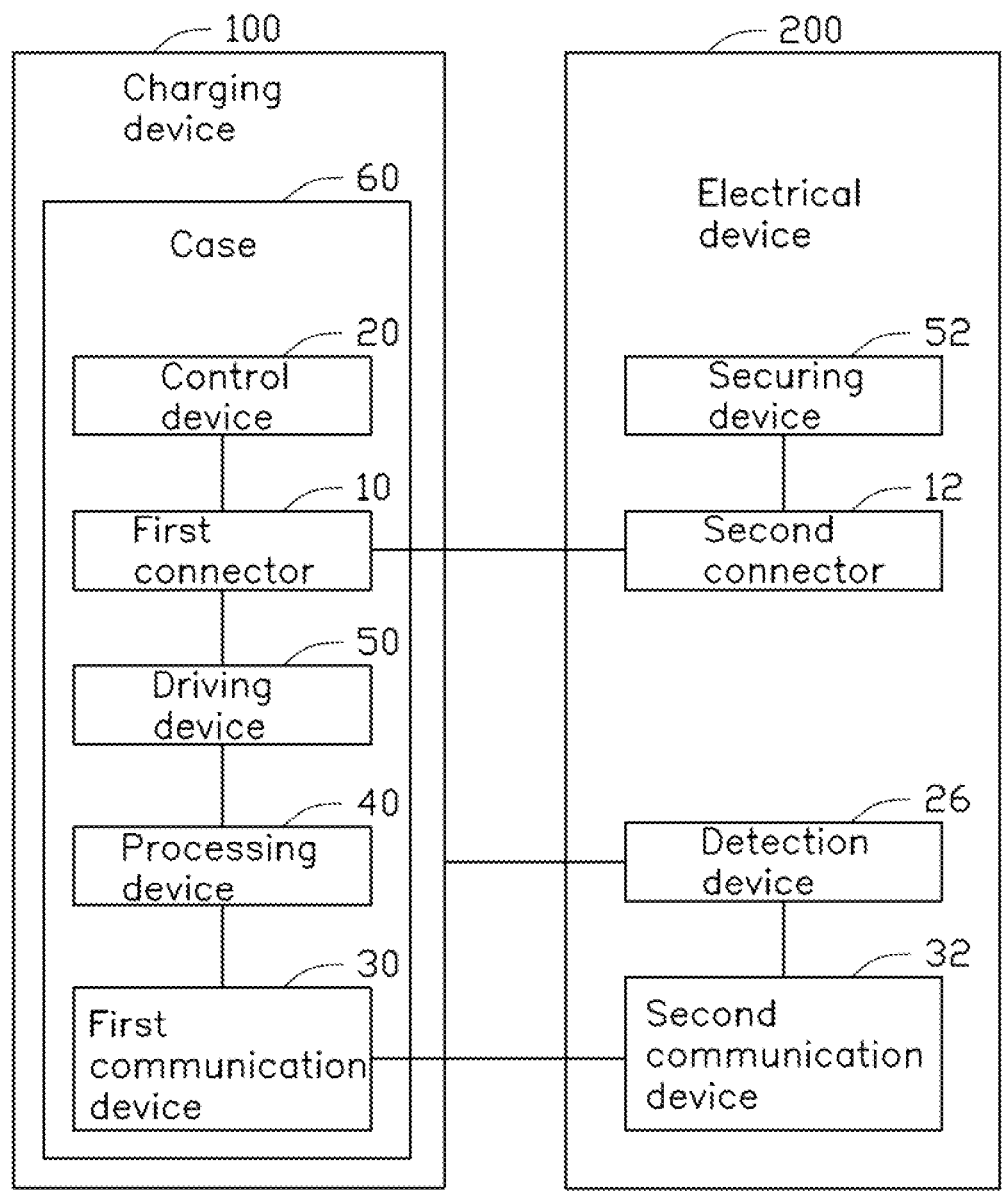
FIG. 1 is a block diagram of one exemplary embodiment of a charging system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

The present disclosure is described in relation to a charging system to provide a charging device to charge an electrical device.

FIG. 1 illustrates an exemplary embodiment of a charging system. The charging system comprises a charging device 100 and an electrical device 200. The charging device 100 is configured to charge the electrical device 200. The charging device 100 is configured to wirelessly communicate with the electrical device 200. In at least one exemplary embodiment, the electrical device 200 is a robot device.

The charging device 100 comprises a first connector 10, a control device 20, a first communication device 30, a processing device 40, a driving device 50, and a case 60. The first connector 10, the control device 20, the first communication device 30, the processing device 40, and the driving device 50 are mounted in the case 60. The case 60 defines an opening 62 (shown in FIG. 3). The first connector 10 is coupled to the control device 20. The first connector 10 is mounted in the case 60 to be in a first position. The control device 20 is coupled to the driving device 50. The driving device 50 is coupled to the processing device 40. The processing device 40 is coupled to the first communication device 30. The first connector 10 is configured to output a working voltage to charge the electrical device 200.

The electrical device 200 comprises a second connector 12, a detection device 26, a second communication device 32, and a securing device 52. The second connector 12 is configured to couple to the first connector 10 to receive the working voltage from the first connector 10 to charge the electrical device 200. The detection device 26 is coupled to the second communication device 32. The second communication device 32 is configured to communicate with the first communication device 30. The first communication device 30 is configured to send a first control signal after communicating with the second communication device 32. The securing device 52 is configured to secure the second connector 12 to the first connector 10. In at least one exemplary embodiment, the securing device 52 is a magnet.

Figure 2:
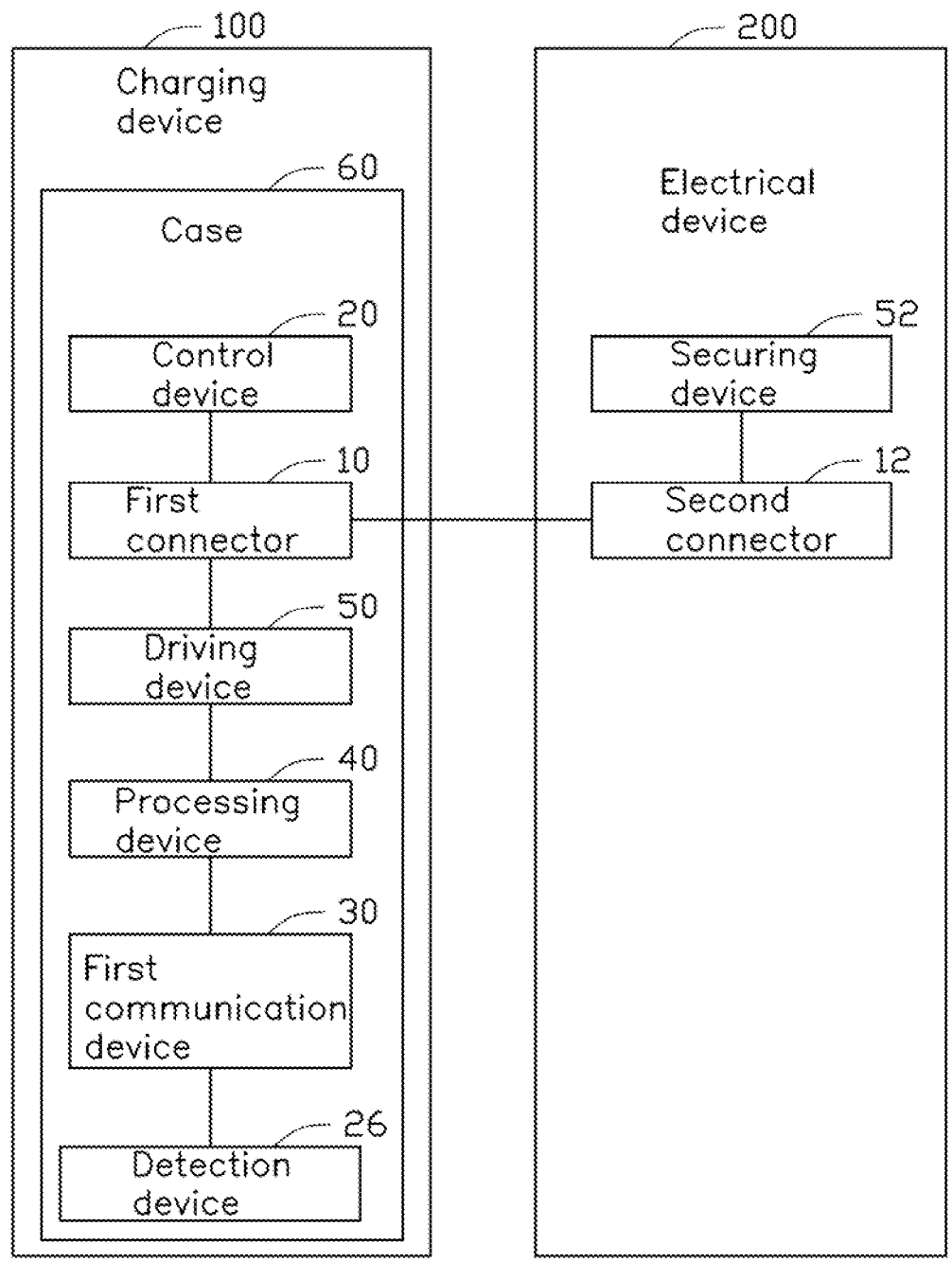
FIG. 2 is a block diagram of another exemplary embodiment of a charging system.

FIG. 2 illustrates that in another exemplary embodiment, the detection device 26 is mounted in the case 60. The electrical device 200 will then comprise the second connector 12 and the securing device 52 without the second communication device 32.

The detection device 26 of the electrical device 200 stores a reference range. In at least one exemplary embodiment, the reference range is from 1 meter to 3 meters. The detection device 26 is configured to detect a distance between the electrical device 200 and the charging device 100. The detection device 26 is further configured to determine whether the distance is within the reference range.

Figure 3:
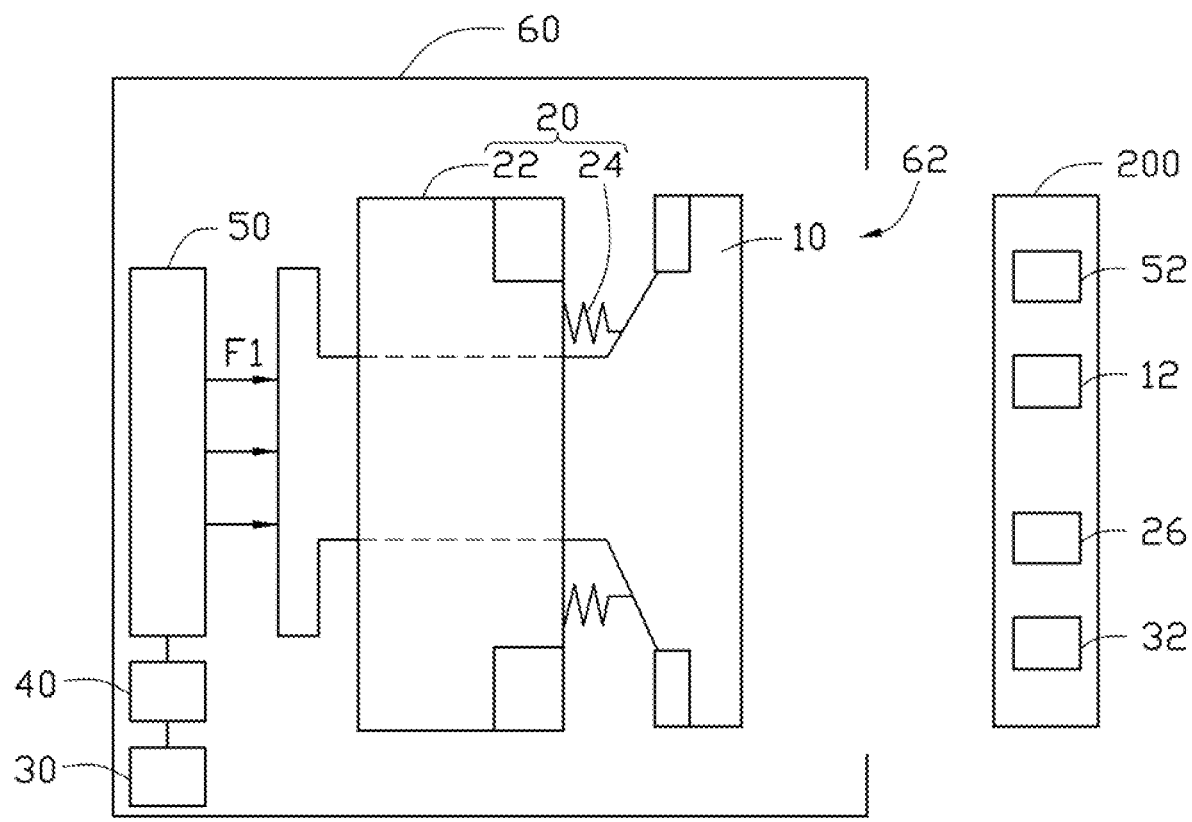
FIG. 3 is a diagrammatic view of the charging system of FIG. 1, showing the driving device configured to apply a pushing force.

When the detection device 26 is mounted in the electrical device 200, and if it is determined that the distance is within the reference range, the second communication device 32 of the electrical device 200 is configured to communicate with the first communication device 30 of the charging device 100. The first communication device 30 is configured to send a first control signal to the processing device 40 after communicating with the second communication device 32. The processing device 40 is configured to output a driving signal to the driving device 50 after receiving the first control signal. FIG. 3 illustrates that the driving device 50 is configured to provide a pushing force F1 to push the first connector 10 to move after receiving the driving signal, thereby enabling the first connector 10 to extend from the opening 62 of the case 60 to couple to the second connector 12 (shown in FIG. 1). The control device 20 includes a frame 22 and an elastic member 24, and the elastic member 24 is fixedly coupled between the frame 22 and the first connector 10. In one exemplary embodiment, the control device 20 further includes a first magnet (not shown) and a second magnet (not shown), the first magnet is disposed on the frame 22, the second magnet is disposed on the first connector, and the first magnet and the second magnet are isotropically attracted to each other. A mutual attraction magnetic force is generated between the frame 22 and the first connector 10 to pull the first connector 10 back to the original position. The first connector 10 is in a second position when being coupled to the second connector 12. The elastic member 24 elastically deforms when an elastic force is provided by the second connector 12 being coupled to the first connector 10. The securing device 52 is configured to secure the second connector 12 to the first connector 10 after the first connector 10 is coupled to the second connector 12. Thus, the second connector 12 is configured to receive the working voltage from the first connector 10. The charging device 100 is configured to charge the electrical device 200.

When the detection device 26 is mounted in the case 60, and if it is determined that the distance is within the reference range, the first communication device 30 of the charging device 100 is configured to send a second control signal to the processing device 40. The processing device 40 is configured to output the driving signal to the driving device 50 after receiving the second control signal. The driving device 50 is configured to provide the pushing force F1 to push the first connector 10 to move after receiving the driving signal, thereby enabling the first connector 10 to extend from the opening 62 of the case 60 to couple to the second connector 12. The first connector 10 is in the second position when being coupled to the second connector 12. The elastic member 24 is elastically deformed to form the elastic force after the second connector 12 is coupled to the first connector 10. The securing device 52 is configured to secure the second connector 12 to the first connector 10 after the first connector 10 is coupled to the second connector 12. Thus, the second connector 12 is configured to receive the working voltage from the first connector 10. The charging device 100 is configured to charge the electrical device 200.

In one exemplary embodiment, each of the second communication device 32 and the first communication device 30 can be one or more of an infrared communication device, a sound communication device, a visual communication device, or a laser communication device.

Figure 4:
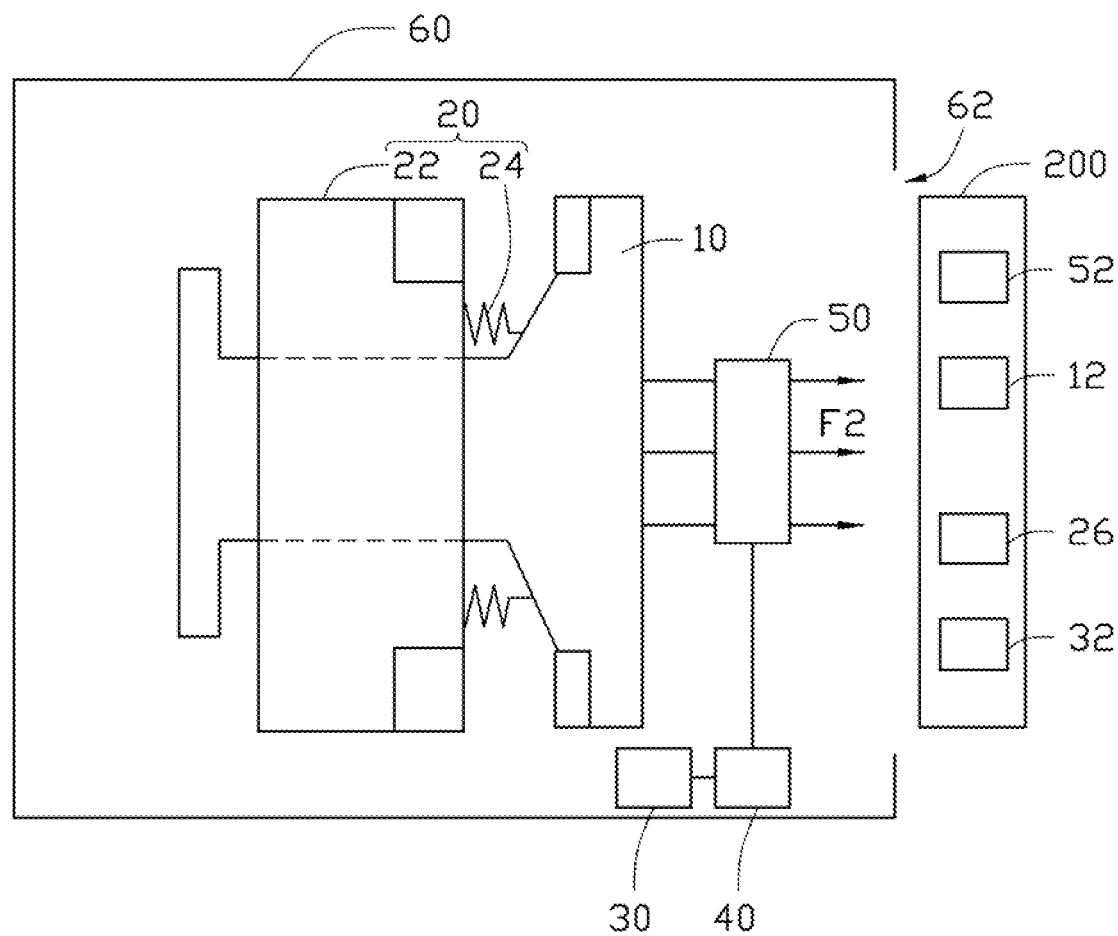
FIG. 4 is another diagrammatic view of the charging system of FIG. 1, showing the driving device configured to apply a pulling force.

FIG. 4 illustrates that in another exemplary embodiment, the driving device 50 is configured to provide a pulling force F2 to pull the first connector 10 to move after receiving the driving signal, thereby enabling the first connector 10 to extend from the opening 62 of the case 60 to couple to the second connector 12.

In at least one exemplary embodiment, each of the pushing force and the pulling force from the device 50 is greater than the elastic restoring force of the elastic member 24 when elastically deformed.

In one exemplary embodiment, the processing device 40 cannot output the driving signal to the driving device 50 after the second connector 12 is coupled to the first connector 10. The driving device 50 cannot provide the pushing force F1 without receiving the driving signal. In another exemplary embodiment, the second connector 12 disconnects from the first connector 10 after the electrical device 200 finished being charged, thus, the processing device 40 cannot output the driving signal to the driving device 50. The driving device 50 cannot provide the pushing force F1 without receiving the driving signal.

The elastic member 24 can restore to release the elastic deformation, and the force of restoration pulls the first connector 10 to be the first position after the second connector 12 disconnects from the first connector 10.

In another exemplary embodiment, the securing device 52 can be secured to the charging device 100.

In one exemplary embodiment, the detection device 26 can be an infrared device or an ultrasonic device.

It is to be understood that even though numerous characteristics and advantages have been set forth in the foregoing description of embodiments, together with details of the structures and functions of the embodiments, the disclosure is illustrative only and changes may be made in detail, including in the matters of shape, size, and arrangement of parts within the principles of the disclosure to the full extent indicated by the broad general meaning of the terms in which the appended claims are expressed.

What is claimed is:

1. A charging device configured to charge an electrical device, comprising:
    a case;
    a control device;
    a first connector mounted in the case;
    a first communication device mounted in the case;
    a processing device mounted in the case; and
    a driving device mounted in the case;
    wherein the first communication device is configured to send a control signal to the processing device;
    wherein the processing device is configured to output a driving signal to the driving device after receiving the control signal;
    wherein the driving device is configured to provide a pushing force to push the first connector to move after receiving the driving signal;
    wherein the first connector is configured to extend from the case to couple to a second connector of the electrical device after receiving the pushing force;
    wherein the control device is mounted in the case, the control device comprises a frame; and
    wherein the charging device further comprises a detection device, the detection device is mounted in the case, the detection device is configured to detect a distance between the electrical device and the charging device, the detection device is further configured to determine whether the distance is within a reference range, and the first communication device is configured to send the control signal to the processing device after the distance is within the reference range.

2. The charging device of claim 1, further comprising a securing device, wherein the securing device is configured to secure the second connector to the first connector.

3. A charging device configured to charge an electrical device, comprising:
    a case;
    a control device;
    a first connector mounted in the case to be a first position;
    a first communication device mounted in the case;
    a processing device mounted in the case; and
    a driving device mounted in the case;
    wherein the first communication device is configured to:
        communicate with a second communication device of the electrical device; and
        send a control signal to the processing device after communicating with the second communication device;
    wherein the processing device is configured to output a driving signal to the driving device after receiving the control signal;
    wherein the driving device is configured to provide a pushing force to push the first connector to move after receiving the driving signal;
    wherein the first connector is configured to extend from the case to couple to a second connector of the electrical device after receiving the pushing force;
    wherein the first connector is configured to be in a second position after being coupled to the second connector;

wherein the control device is mounted in the case, the control device comprises a frame; and wherein the charging device further comprises a detection device, the detection device is mounted in the electrical device, the detection device is configured to detect a distance between the electrical device and the charging device, the detection device is further configured to determine whether the distance is within a reference range, and the first communication device is configured to communicate with the communication device after the distance is within the reference range.

4. The charging device of claim 3, wherein the pushing force is greater than an elastic restoring force of an elastic member when elastically deformed.

5. A charging system comprising:
a charging device comprising:
a case;
a control device;
a first connector mounted in the case to be in a first position;
a first communication device mounted in the case;
a processing device mounted in the case; and
a driving device mounted in the case; and
an electrical device comprising a second communication device;
wherein the first communication device is configured to:
communicate with the second communication device; and
send a control signal to the processing device after communicating with the second communication device;
wherein the processing device is configured to output a driving signal to the driving device after receiving the control signal;
wherein the driving device is configured to provide a pushing force to push the first connector to move after receiving the driving signal;
wherein the first connector is configured to extend from the case to couple to a second connector of the electrical device after receiving the pushing force;
wherein the first connector is configured to be in a second position after being coupled to the second connector;
wherein the control device is mounted in the case, the control device comprises a frame; and
wherein the charging device further comprises a detection device, the detection device is mounted in the electrical device, the detection device is configured to detect a distance between the electrical device and the charging device, the detection device is further configured to determine whether the distance is within a reference range, and the first communication device is configured to communicate with the communication device after the distance is within the reference range.

6. The charging system of claim 5, wherein the pushing force is greater than an elastic restoring force of an elastic member when elastically deformed.

7. A charging system comprising:
an electrical device; and
a charging device comprising:
a case;
a control device;
a first connector mounted in the case;
a first communication device mounted in the case;
a processing device mounted in the case; and
a driving device mounted in the case;
wherein the first communication device is configured to send a control signal to the processing device;
wherein the processing device is configured to output a driving signal to the driving device after receiving the control signal;
wherein the driving device is configured to provide a pushing force to push the first connector to move after receiving the driving signal;
wherein the first connector is configured to extend from the case to couple to a second connector of the electrical device after receiving the pushing force;
wherein the control device is mounted in the case, the control device comprises a frame; and
wherein the charging device further comprises a detection device, the detection device is mounted in the case, the detection device is configured to detect a distance between the electrical device and the charging device, the detection device is further configured to determine whether the distance is within a reference range, and the first communication device is configured to send the first control signal to the processing device after the distance is within the reference range.

8. The charging system of claim 7, further comprising a securing device, wherein the securing device is configured to secure the second connector to the first connector.

9. The charging device of claim 1, wherein the control device further comprises an elastic member, the elastic member elastically deforms when the first connector is coupled to the second connector.

10. The charging device of claim 9, wherein the elastic member rebounds and moves the first connector when the first connector is disconnected from the second connector.

11. The charging device of claim 3, wherein the control device further comprises an elastic member, the elastic member elastically deforms when the first connector is coupled to the second connector.

12. The charging device of claim 11, wherein when the elastic member rebounds, the elastic member pulls the first connector to move to the first position.

13. The charging system of claim 5, wherein the control device further comprises an elastic member, the elastic member elastically deforms when the first connector is coupled to the second connector.

14. The charging system of claim 13, wherein when the elastic member rebounds, the elastic member pulls the first connector to move to the first position.

15. The charging system of claim 7, wherein the control device further comprises an elastic member, the elastic member elastically deforms when the first connector is coupled to the second connector.

16. The charging system of claim 15, wherein the elastic member rebounds and moves the first connector when the first connector is disconnected from the second connector.

* * * * *